Figure 1:
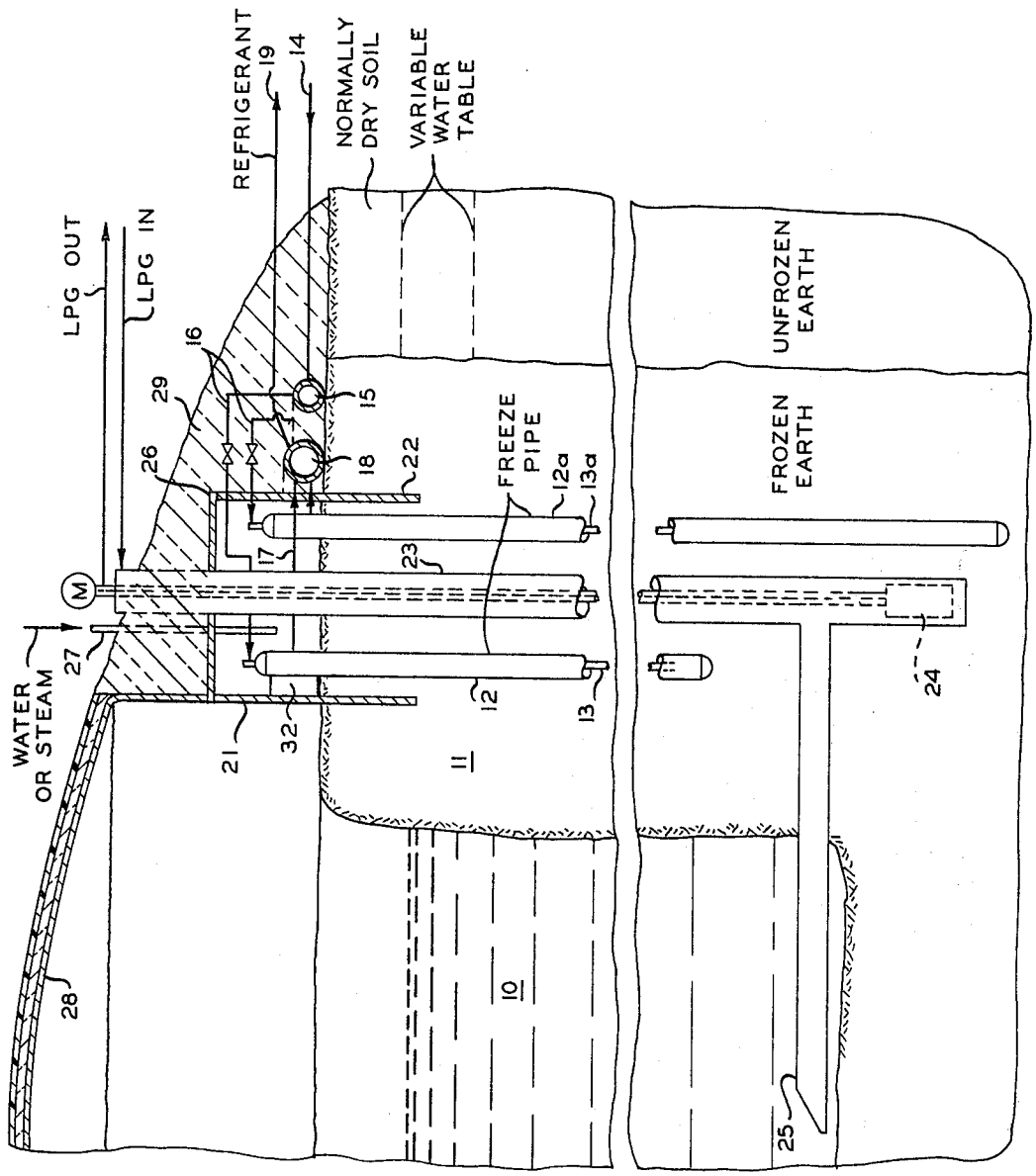

Nov. 8, 1966  D. E. HULL  3,283,512
EARTHEN STORAGE FOR VOLATILE LIQUIDS AND METHOD
OF CONSTRUCTING THE SAME
Filed Aug. 19, 1963  2 Sheets-Sheet 1

INVENTOR.
D. E. HULL
BY Young and Quigg
ATTORNEYS

Nov. 8, 1966  D. E. HULL  3,283,512
EARTHEN STORAGE FOR VOLATILE LIQUIDS AND METHOD
OF CONSTRUCTING THE SAME
Filed Aug. 19, 1963                                    2 Sheets-Sheet 2

INVENTOR.
D. E. HULL
BY Young and Quigg
ATTORNEYS

United States Patent Office 3,283,512
Patented Nov. 8, 1966

3,283,512
EARTHEN STORAGE FOR VOLATILE LIQUIDS AND METHOD OF CONSTRUCTING THE SAME
Donald E. Hull, Bountiful, Utah, assignor to Phillips Petroleum Company, a corporation of Delaware
Filed Aug. 19, 1963, Ser. No. 302,885
4 Claims. (Cl. 61—.5)

This invention relates to the storage of volatile liquids. In one aspect it relates to a method for preparing a reservoir in the surface of the earth for the storage of volatile liquids. In another aspect it relates to an open-topped earthen reservoir in frozen earth having a vapor-impermeable cover thereover.

The petroleum industry produces great quantities of voltatile liquid hydrocarbons as a result of processing crude oil and natural gas. Volatile liquids such as propane and butane require enormous storage facilities during periods of slack use. Increased seasonal demand for such products places an increased strain on these facilities. Great quantities of volatile liquids including propane and butane have been stored in underground caverns mined or dissolved from impervious formations. Such reservoirs, however, are limited to certain formations which are not always available at the desired location; are expensive to prepare; and present a serious problem of providing adequate vapor seals. More recently it has been proposed to fill an open-topped earthen reservoir with water, refrigerate the reservoir so as to freeze an ice cap on the water, pump out the water and fill the reservoir with a volatile liquid. Such reservoir is disclosed and claimed in Patent Number 2,961,840, issued November 29, 1960, to W. A. Goldtrap.

The principal problem encountered in a frozen earth storage system is that of providing and maintaining an adequate vapor seal between the earthen reservoir and the cover or roof for the reservoir. The sealing problem is aggravated by the normal rise and fall of the water table at the site of the reservoir and by the loss of ice from the frozen earth by the process of sublimation. The seal between the roof and the earth is dependent upon ice and therefore the moisture must be maintained in the frozen earth to effect the seal.

According to the present invention the seal between the frozen earth around the periphery of an earthen reservoir and the roof covering the reservoir is accomplished and maintained by means of two spaced, vapor-impermeable walls surrounding the reservoir and sunk into the frozen earth. The walls are preferably positioned on either side of the freeze pipes which enclose the reservoir site and are usually made of metal such as tank plate. A vapor-tight cover plate is secured to the tops of the walls so as to seal the space between the two walls and the earth inside and on either side of the walls is saturated with water during the period of freezing the earth at the reservoir site.

Additional water can be added to the earth surface in the sealed space between the walls after the earth is frozen to form an ice sheet as additional sealing means. Water or steam can be added from time to time as desired to add to the ice sheet.

Figure 2:
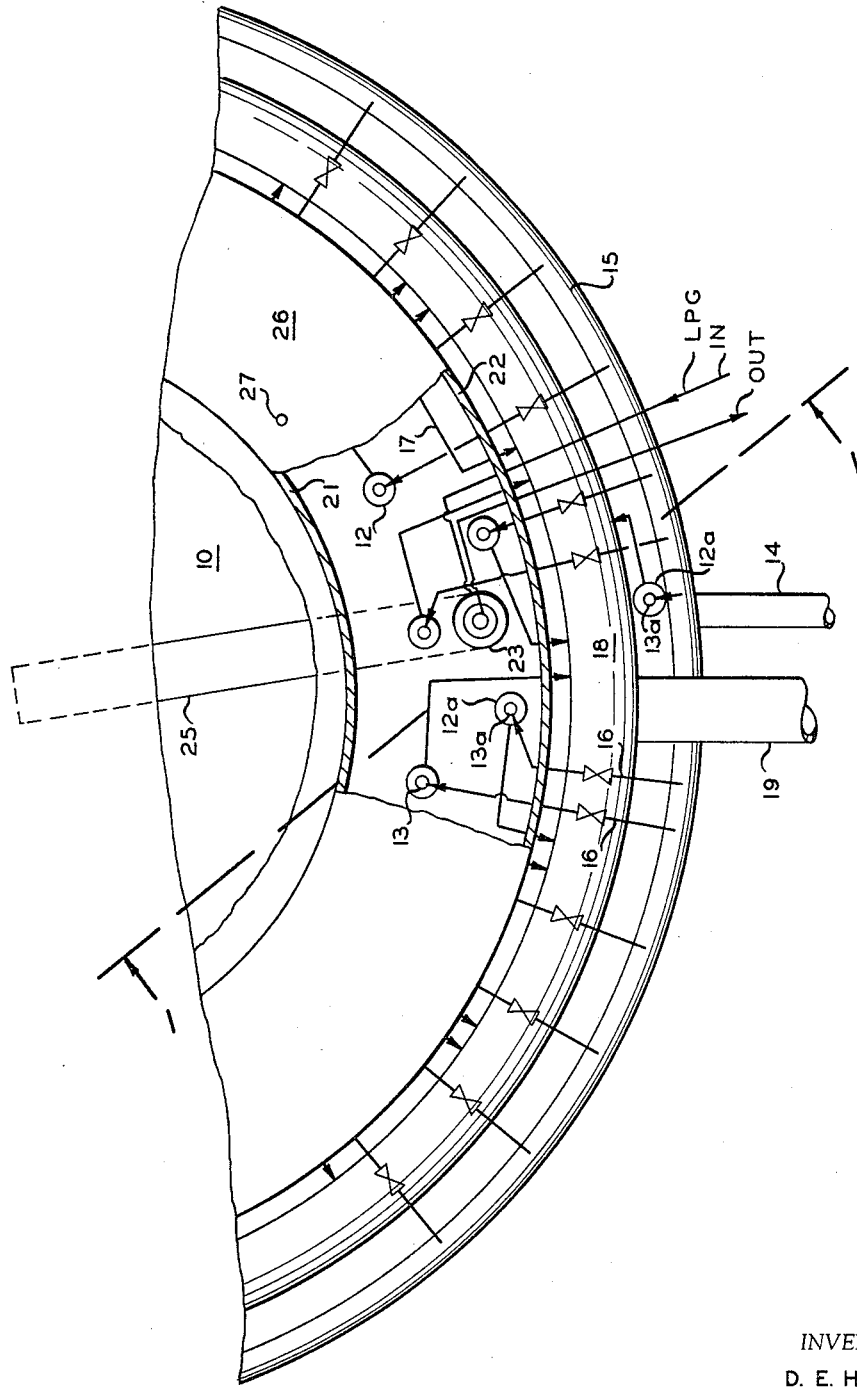

It is an object of this invention to provide a method for establishing and maintaining a vapor-tight seal between the frozen earth of an earthen reservoir and the roof of the reservoir. It is also an object of the invention to provide a positive and permanent vapor-tight seal between the frozen earth of an earthen reservoir and the roof of the reservoir. It is a further object to provide a closure for an ice seal to prevent loss of moisture by sublimation. The provision of means to add moisture to the ice seal from time to time is an additional object of the invention. Other objects and advantages of the invention will be apparent to one skilled in the art upon studying the disclosure of the invention including the detailed description and the appended drawing wherein:

FIGURE 1 is a view in cross section of a portion of the wall and roof of an earthen reservoir employing the seal of the invention; and FIGURE 2 is a plan view of a segment of the reservoir of FIGURE 1 with a portion of the roof and plate cover for the two walls removed.

In FIGURE 1 a reservoir 10 is excavated in frozen earth 11. The earth is frozen by means of a plurality of freeze pipes sunk into the ground around the site of the reservoir 10. The freeze pipes each comprise a conduit 12 and a refrigerant pipe 13. A refrigerant is supplied to inlet pipe 13 via conduit 14, manifold 15 and conduit 16 from a refrigeration system (not shown). Several rows of freeze pipes can be utilized as desired as indicated at 12a and 13a. Refrigerant vapors are removed from conduit 12 via conduit 17, manifold 18 and conduit 19 and returned to the refrigeration system. The refrigeration system can be a conventional compressor and condenser combination.

A steel wall 21 is sunk into the ground between the reservoir and the first line of freeze pipes. A second steel wall 22 is sunk into the ground outside the second line of freeze pipes so that two vapor-impermeable walls surround the reservoir and enclose between them the freeze pipes. The walls 21 and 22 are sunk into the earth from about 4 to 10 feet and the freeze pipes are sunk into the earth from about 100 to 200 feet depending on the intended depth of the reservoir. A pump jacket conduit 23 is also sunk into the earth to accommodate a submerged pump 24. A conduit 25 connects the pump jacket to the reservoir 10.

A vapor-impermeable cover 26 is sealed to the tops of the walls 21 and 22. The earth between the walls 21 and 22 is saturated with water prior to freezing the earth by means of the freeze pipes and this can be done before the cover 26 is sealed to the wall tops or can be done after the cover is installed via a plurality of water inlet conduits 27. The earth outside and adjacent the double wall enclosure is also saturated with water prior to freezing the earth adjacent the reservoir site.

An insulated, vapor-impermeable roof 28 is placed over the finished reservoir 10 and is sealed to the double walled structure 21, 22 and 26. Insulation 29 extends from the roof 28 to a point beyond the area of frozen earth.

Insulation 29 can be any solid insulating material such as expanded minerals, glass or mineral wool or even crushed rock or dry earth. A weatherproof cover such as polyethylene film is often employed as a cover for the roof 28 and insulation 29.

Loss of moisture as a result of sublimation of ice in the frozen earth is believed to be the principal cause of seal failure in a volatile liquid storage system wherein an insulated, vapor-impermeable roof over an open-topped earthen reservoir is sealed to the frozen earth. In such system it is necessary to seal the roof to the frozen earth with an ice seal utilizing the ice of the frozen earth as the sealing medium. Since the normal water table in most areas wherein a reservoir site is selected will be considerably below the grade level of the reservoir and since the normal water table level will vary considerably with the seasons it is usually impractical to sink a sealing wall such as a single wall 21 to a level in the earth so that the bottom of the wall is always below the water table level.

It is desirable to maintain a positive vapor pressure on the internal surfaces of the reservoir so as to preclude the possibility of atmospheric air entering the system and to provide a measure of assistance in supporting the roof. The slow but inexorable loss of moisture through sublimation of ice in the surface earth will result in vapor leaks unless an adequate vapor retaining means such as provided by the present invention is utilized. The liquid and vapor in the reservoir system will be saturated with moisture at the reservoir temperature and pressure and since the reservoir contents are being periodically depleted and replenished there will be a continuing, though small, drain on the moisture in the earth surface in contact with the reservoir contents. The enclosed space between the walls 21 and 22 being substantially hermetically sealed will not be subject to loss of moisture through sublimation of the ice in the earthen formation because the atmosphere will remain saturated with moisture with no drain on the moisture of the earthen formation.

The vapor pressure on the interior of the reservoir can be maintained at a level such that the roof is at least partly supported by the compressed vapor over the body of liquid. The vapor pressure can be maintained at any desired level by removing vapor at a controlled rate for compression, cooling and return to the reservoir.

The invention will now be described as applied to a circular earthen reservoir 95 feet in diameter and 95 feet in depth. A first 111-foot diameter circle and a second 117-foot diameter circle of freeze pipes are sunk about 150 feet into the ground. Liquid refrigerant is supplied to the bottom of the freeze pipes by tubing which extends nearly to the bottom of the freeze pipes. Liquid propane is utilized as refrigerant.

A ring wall 6 feet in height of ¼ inch thick tank steel plate is sunk 4 feet into the ground on the inside of the circle of freeze pipes and a similar wall is sunk into the ground on the outside of the circle of freeze pipes so as to enclose the rows of freeze pipes between two continuous vapor-impermeable walls. The earth around the periphery of the reservoir site is saturated with water before the freezing operation is begun. The space between the walls is filled with loose crushed rock and the cover is welded to the tops of the walls. The crushed rock serves to provide structural strength to the double-walled enclosure. A water or steam inlet conduit is positioned through the cover about every 10 feet. Water is introduced through the inlet conduits prior to the freezing operation to saturate the earth and space between the walls. The structure is covered with crushed rock for protection against heavy machinery and the freezing is started. Excavation of the reservoir is begun about two months after freezing is started. The exposed frozen wall of the reservoir is insulated as excavation progresses.

The roof is then fabricated and welded to the top of the ring wall. The roof is dome-shaped and is supported by a plurality of trusses which radiate from the center and rest on the ring wall. The truss structure is assembled on the ground adjacent the reservoir and is then placed in position by two cranes. Fitting and welding the roof to the top of the ring wall is facilitated by first welding an angle iron member to the roof edge and a similar angle iron member to the top of the ring wall so that the flat or plane sides of the angle iron members provide the junction of the roof and ring wall. The two connecting flat surfaces will allow considerable adjustment in fitting the roof to the ring wall. The roof is then insulated with glass wool bats and covered with a weather proof polyethylene film sheet. The insulation is continued around the periphery of the roof past the area of frozen earth.

The metal used in the above storage system for low temperature service, e.g., the freeze pipes, roof and ring wall is weldable steel having superior low temperature impact properties. Steel for such service is commercially available.

The above reservoir is for the storage of liquid propane at substantially atmospheric pressure. Other volatile liquids such as liquefied natural gas; liquefied methane, ethane, or butane; liquid ammonia; and the like, can be stored in the above reservoir by choosing the proper refrigerant.

That which is claimed is:

1. The method of sealing a roof to an open-topped earthen reservoir in frozen earth wherein the earth adjacent the reservoir is maintained frozen by means of a plurality of freeze pipes sunk into the earth around the periphery of the reservoir which comprises partially sinking a first vapor-impermeable wall into the earth between said reservoir and said freeze pipes; partially sinking a second vapor-impermeable wall into the earth so as to enclose said freeze pipes between said walls; saturating the earth between said first and second walls with water; sealing a vapor-impermeable cover to the tops of said walls; sealing a vapor-impermeable roof over said reservoir to said walls; and freezing the water-saturated earth between said walls.

2. The method of claim 1 wherein water is added periodically to the earth between said walls to maintain the earth saturated with water.

3. The method of claim 2 wherein the water is added in the form of steam to melt momentarily the surface of the earth between said walls and to form a cover of ice over the earth between said walls.

4. An earthen storage system for normally gaseous liquid comprising an open-topped earthen reservoir in frozen earth; freeze pipes vertically positioned in the earth around the periphery of said reservoir to maintain the walls of the reservoir frozen; a first and second vapor-impermeable steel wall partially sunk into the frozen earth around the periphery of said reservoir on each side of, and adjacent, said freeze pipes; a vapor-impermeable cover sealed to and connecting the tops of said walls to prevent sublimation of ice from the frozen earth between said walls; a vapor-impermeable roof covering said reservoir, supported by and sealed to said walls; and means to introduce water to the earth between said walls.

References Cited by the Examiner

UNITED STATES PATENTS

| | | | |
|---|---|---|---|
| 2,961,840 | 11/1960 | Goldtrap | 61—.5 X |
| 3,175,370 | 3/1965 | Schlumberger et al. | 61—.5 X |
| 3,195,310 | 7/1965 | Schroeder | 61—.5 X |

FOREIGN PATENTS

| | | |
|---|---|---|
| 111,569 | 3/1962 | Pakistan. |

EARL J. WITMER, *Primary Examiner.*